(12) United States Patent
Louis et al.

(10) Patent No.: US 6,326,424 B1
(45) Date of Patent: Dec. 4, 2001

(54) TIRE TREAD COMPOUND

(75) Inventors: Olivier Louis, Arlon (BE); Adel Farhan Halasa, Bath; Wen-Liang Hsu, Cuyahoga Falls, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/416,844

(22) Filed: Oct. 12, 1999

Related U.S. Application Data

(60) Provisional application No. 60/104,059, filed on Oct. 13, 1998.

(51) Int. Cl.$^7$ .............................. C08K 5/37; B60C 11/00; B60C 5/00
(52) U.S. Cl. ..................... 524/262; 524/492; 524/493; 524/495; 524/496; 152/209.1; 152/450; 152/525
(58) Field of Search ................ 524/262, 492, 524/493, 495, 496, 860; 525/236, 237; 523/212, 213; 152/209 R, 209.1, 450, 525

(56) References Cited

U.S. PATENT DOCUMENTS

| | | | |
|---|---|---|---|
| 4,843,120 | 6/1989 | Halasa et al. | 525/53 |
| 5,047,483 | 9/1991 | Halasa et al. | 525/237 |
| 5,087,668 | 2/1992 | Standstrom | 525/237 |
| 5,137,998 | 8/1992 | Hsu et al. | 526/174 |
| 5,231,153 | 7/1993 | Hsu et al. | 526/181 |
| 5,272,220 | 12/1993 | Rodgers et al. | 525/332.3 |
| 5,336,739 | 8/1994 | Hsu et al. | 526/181 |
| 5,504,140 | 4/1996 | Zanzig et al. | 524/526 |
| 5,616,639 | * 4/1997 | Lucas | 524/262 |

FOREIGN PATENT DOCUMENTS 620250A   10/1994   (EP) .

* cited by examiner

Primary Examiner—David W. Wu
Assistant Examiner—R. Harlan
(74) Attorney, Agent, or Firm—Alvin T. Rockhill

(57) ABSTRACT

It has been unexpectedly determined that isoprene-butadiene rubber having a high glass transition temperature within the range of about −40° C. to about −25° C. (high Tg IBR) can be loaded with silica as a filler and utilized in manufacturing tire treads that have outstanding performance characteristics. For instance, such tire treads offer lower hysteresis at high temperatures (improved rolling resistance) and higher hysteresis at low temperatures (improved wet traction characteristics). By utilizing high Tg IBR in tire tread compounds, the maximum benefits of silica compounding can be realized without the need for solution or emulsion styrene-butadiene rubber (SBR) in the tread rubber formulations. The tire tread rubber formulations of this invention will normally contain about 20 phr (parts per 100 parts of rubber) to about 100 phr of the high Tg IBR. In other words, the tread rubber will normally contain at least 20 phr of the high Tg IBR and can contain up to 100 phr of the high Tg IBR. The tread compound will also contain 40 phr to 150 phr of a filler with the proviso that at least about 20 phr of silica is included in the filler. The tire tread compound will also contain a silica coupling agent. This invention more specifically discloses a tire tread rubber composition which is comprised of (1) at least about 20 phr of an isoprene-butadiene rubber having a glass transition temperature which is within the range of about −40° C. to −25° C., (2) 40 phr to 150 phr of a filler, with the proviso that the filler contains at least about 20 phr of silica, and (3) a silica coupling agent.

17 Claims, No Drawings

TIRE TREAD COMPOUND

This application claims the benefit of U.S. Provisional Application 60/104,059 filed Oct. 13, 1998.

BACKGROUND OF THE INVENTION

It is desirable for a tire to exhibit good traction characteristics on wet and dry pavements, and for the tire to provide good treadwear and low rolling resistance. In order to reduce she rolling resistance of a tire, rubbers having a high rebound can be utilized in making the tires' treads. Tires made with such rubbers undergo less energy loss during rolling. The traditional problem associated with this approach is that the tire's wet traction and wet skid resistance characteristics are compromised. This is because good rolling resistance which favors low energy loss and good traction characteristics which favor high energy loss are viscoelastically inconsistent properties.

In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads. To further improve traction characteristics, silica is also commonly included in the tread rubber as a filler. However, such blends are not totally satisfactory for all purposes.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about −100° C. to −20° C. and exhibit a second glass transition temperature which is within the range of about −50° C. to 0° C. According to U.S. Pat. No. 4,843,120, these polymers are made by polymerizing at least one conjugated diolefin monomer in a first reaction zone at a temperature and under conditions sufficient to produce a first polymeric segment having a glass transition temperature which is between −110° C. and −20° C. and subsequently continuing said polymerization in a second reaction zone at a temperature and under conditions sufficient to produce a second polymeric segment having a glass transition temperature which is between −20° C. and 20° C. Such polymerizations are normally catalyzed with an organolithium catalyst and are normally carried out in an inert organic solvent.

U.S. Pat. No. 5,137,998 discloses a process for preparing a rubbery terpolymer of styrene, isoprene and butadiene having multiple glass transition temperatures and having an excellent combination of properties for use in making tire treads which comprises terpolymerizing styrene, isoprene and 1,3-butadiene in an organic solvent at a temperature of no more than about 40° C. in the presence of (a) at least one member selected from the group consisting of tripiperidino phosphine oxide and alkali metal alkoxides and (b) an organolithium compound.

U.S. Pat. No. 5,047,483 discloses a pneumatic tire having an outer circumferential tread where said tread is a sulfur-cured rubber composition comprised of, based on 100 parts by weight rubber (phr), (A) about 10 to about 90 parts by weight of a styrene, isoprene, butadiene terpolymer rubber (SIBR), and (B) about 70 to about 30 weight percent of at least one of cis 1,4-polyisoprene rubber and cis 1,4-polybutadiene rubber wherein said SIBR rubber is comprised of (1) about 10 to about 35 weight percent bound styrene, (2) about 30 to about 50 weight percent bound isoprene and (3) about 30 to about 40 weight percent bound butadiene and is characterized by having a single glass transition temperature (Tg) which is in the range of about −10° C. to about −40° C. and, further, the said bound butadiene structure contains about 30 to about 40 percent 1,2-vinyl units, the said bound isoprene structure contains about 10 to about 30 percent 3,4-units and the sum of the percent 1,2-vinyl units of the bound butadiene and the percent 3,4-units of the bound isoprene is in the range of about 40 to about 70 percent.

U.S. Pat. No. 5,272,220 discloses a styrene-isoprene-butadiene rubber which is particularly valuable for use in making truck tire treads which exhibit improved rolling resistance and tread wear characteristics, said rubber being comprised of repeat units which are derived from about 5 weight percent to about 20 weight percent styrene, from about 7 weight percent to about 35 weight percent isoprene and from about 55 weight percent to about 88 weight percent 1,3-butadiene, wherein the repeat units derived from styrene, isoprene and 1,3-butadiene are in essentially random order, wherein from about 25 percent to about 40 percent of the repeat units derived from the 1,3-butadiene are of the cis-microstructure, wherein from about 40 percent to about 60 percent of the repeat units derived from the 1,3-butadiene are of the trans-microstructure, wherein from about 5 percent to about 25 percent of the repeat units derived from the 1,3-butadiene are of the vinyl-microstructure, wherein from about 75 percent to about 90 percent of the repeat units derived from the isoprene are of the 1,4-microstructure, wherein from about 10 percent to about 25 percent of the repeat units derived from the isoprene are of the 3,4-microstructure, wherein the rubber has a glass transition temperature which is within the range of about −90° C. to about −70° C., wherein the rubber has a number average molecular weight which is within the range of about 150,000 to about 400,000, wherein the rubber has a weight average molecular weight of about 300,000 to about 800,000 and wherein the rubber has an inhomogeneity which is within the range of about 0.5 to about 1.5.

U.S. Pat. No. 5,231,153 and U.S. Pat. No. 5,336,739 disclose that alkyl tetrahydrofurfuryl ether compounds, having the structural formula:

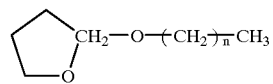

wherein n is an integer from 5 to about 10, can be used as modifiers in the synthesis of polydiene rubbers, such as isoprene-butadiene rubbers. These patents specifically disclose the synthesis of isoprene-butadiene copolymers having high glass transition temperatures of −30° C., −32° C., −37° C. and −39° C. Some specific examples of alkyl tetrahydrofurfuryl ethers which are reported to be useful as modifiers include hexyltetrahydrofurfuryl ether, heptyltetrahydrofurfuryl ether, octyltetrahydrofurfuryl ether and nonyltetrahydrofurfuryl ether. Hexyltetrahydrofurfuryl ether reported to be highly preferred because its utilization does not result in the creation of obnoxious odors and its employment results in fast polymerization rates and the high vinyl contents.

SUMMARY OF THE INVENTION

It has been unexpectedly determined that isoprene-butadiene rubber having a high glass transition temperature within the range of about −40° C. to about −25° C. (high Tg IBR) can be loaded with silica as a filler and utilized in manufacturing tire treads that have outstanding performance characteristics. For instance, such tire treads offer lower hysteresis at high temperatures (improved rolling resistance) and higher hysteresis at low temperatures (improved wet traction characteristics). By utilizing high Tg IBR in tire tread compounds, the maximum benefits of silica compounding can be realized without the need for solution or emulsion styrene-butadiene rubber (SBR) in the tread rubber formulations.

The tire tread rubber formulations of this invention will normally contain about 60 phr (parts per 100 parts of rubber) to about 100 phr of the high Tg IBR. In other words, the tread rubber will normally contain at least 20 phr of the high Tg IBR and can contain up to 100 phr of the high Tg IBR. The tread compound will also contain 40 phr to 150 phr of a filler with the proviso that at least about 20 phr of silica is included in the filler. The tire tread compound will also contain a silica coupling agent.

This invention more specifically discloses a tire tread rubber composition which is comprised of (1) at least about 20 phr of an isoprene-butadiene rubber having a glass transition temperature which is within the range of about −40° C. to −25° C., (2) 40 phr to 150 phr of a filler, with the proviso that the filler contains at least about 20 phr of silica, and (3) a silica coupling agent.

The present invention also reveals a pneumatic tire having an outer circumferential tread wherein said tread is a sulfur-cured rubber composition which is comprised of (1) at least about 20 phr of an isoprene-butadiene rubber having a glass transition temperature which is within the range of about −40° C. to −25° C., (2) 40 phr to 150 phr of a filler, with the proviso that the filler contains at least about 20 phr of silica, and (3) a silica coupling agent.

DETAILED DESCRIPTION OF THE INVENTION

The high Tg IBR of this invention is synthesized by solution polymerization. Such solution polymerizations will normally be carried out in a hydrocarbon solvent which can be one or more aromatic, paraffinic or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene and the like, alone or in admixture.

In the solution polymerizations of this invention, there will normally be from about 5 to about 35 weight percent monomers in the polymerization medium. Such polymerization media are, of course, comprised of the organic solvent, 1,3-butadiene monomer and isoprene monomer. In most cases, it will be preferred for the polymerization medium to contain from 10 to 30 weight percent monomers. It is generally more preferred for the polymerization medium to contain 20 to 25 weight percent monomer.

The monomer charge compositions utilized in the polymerizations of this invention will typically contain from about 20 weight percent to about 80 weight percent isoprene and from about 20 weight percent to about 80 weight percent 1,3-butadiene monomer. It is typically preferred for the monomer charge composition to contain from about 25 weight percent to about 70 weight percent isoprene and from about 30 weight percent to about 75 weight percent 1,3-butadiene.

The high Tg IBR utilized in the tread formulations of this invention can be synthesized on a continuous basis, by a semi-continuous process or by a batch process. In such a continuous process, the monomers, an organolithium initiator, a modifier and an organic solvent system are continuously fed into a reaction vessel or series of reaction vessels. The pressure in the reaction vessel is typically sufficient to maintain a substantially liquid phase under the conditions of the polymerization reaction. The reaction medium will generally be maintained at a temperature which is within the range of about 70° C. to about 140° C. throughout the copolymerization. It is generally preferred for the copolymerization to be conducted in a series of reaction vessels and for the reaction temperature to be increased from reaction vessel to reaction vessel as the polymerization proceeds. For instance, it is desirable to utilize a two reactor system wherein the temperature in the first reactor is maintained within the range of about 70° C. to 90° C. and wherein the temperature in the second reactor is maintained within the range of about 90° C. to about 100° C.

The organolithium compounds which can be utilized as initiators in the terpolymerizations of this invention include organomonolithium compounds and organomonofunctional lithium compounds. The organo multifunctional lithium compounds will typically be organodilithium compounds or organotrilithium compounds. Some representative examples of suitable multifunctional organolithium compounds include 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl and the like.

The organolithium compounds which can be utilized are normally organomonolithium compounds. The organolithium compounds which are preferred can be represented by the formula R-Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium and 4-cyclohexylbutyllithium.

The amount of organolithium initiator employed will be dependent upon the molecular weight which is desired for the high Tb IBR being synthesized. An amount of organolithium initiator will be selected to result in the production of high Tg IBR having a Mooney ML1+4 viscosity which is within the range of 35 to 100. The amount of organolithium initiator will preferably be selected to result in the production of high Tg IBR having a Mooney ML1+4 viscosity which is within the range of 40 to 80. The amount of organolithium initiator will more preferably be selected to result in the production of a high Tg IBR having a Mooney ML 1+4 viscosity which is within the range of about 45 to 65.

As a general rule in all anionic polymerizations, the molecular weight (Mooney viscosity) of the polymer produced is inversely proportional to the amount of catalyst utilized. As a general rule, from about 0.01 to about 1 phm (parts per hundred parts of monomer by weight) of the organolithium compound will be employed. In most cases, it will be preferred to utilize from about 0.015 to about 0.1 phm of the organolithium compound with it being most preferred to utilize from about 0.025 phm to 0.07 phm of the organolithium compound.

To inhibit gelation and to attain the desired high grass transition temperature, it is important to carry out such polymerizations in the presence of a polar modifier, such as N,N,N',N'-tetramethylethylenediamine (TMEDA). For this reason, it is highly desirable to continuously feed a polar modifier into the reaction vessel utilized. Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like. Dipiperidinoethane, dipyrrolidinoethane, tetramethylethylene diamine, diethylene glycol, dimethyl ether, TMEDA and tetrahydrofuran are representative of highly preferred modifiers. U.S. Pat. No. 4,022,959 describes the use of ethers and tertiary amines as polar modifiers in greater detail.

Optionally, 1,2-butadiene can also be continuously fed into the reaction zone. The 1,2-butadiene will typically be present in the polymerization medium at a concentration which is within the range of 10 to about 500 ppm (parts per million parts). It is generally preferred for the 1,2-butadiene to be present at a level which is within the range of about 50 ppm to about 300 ppm. It is generally more preferred for the 1,2-butadiene to be present at a level which is within the range of about 100 ppm to about 200 ppm.

The polar modifier will typically be present at a molar ratio of the polar modifier to the organolithium compound which is within the range of about 0.2:1 to about 1:1. The amount of polar modifier used will be adjusted to attain the desired glass transition temperature within the range of about −40° C. to about −25° C. The molar ratio of polar modifier to the organolithium initiator will preferably be adjusted to produce an isoprene-butadiene rubber having a glass transition temperature which is within the range of about −38° C. to about −30° C. The isoprene-butadiene rubber made will most preferably have a glass transition temperature which is within the range of about −36° C. to about −32° C.

The polymerization is conducted for a length of time sufficient to permit substantially complete polymerization of monomers. In other words, the polymerization is normally carried out until high conversions are attained. The copolymerization will normally be allowed to continue until a conversion in excess of about 90 percent is attained. It is preferred for the conversion to be in excess of about 95 percent with essentially quantitative conversions of greater than about 99 percent preferably being reached. The polymerization can then be terminated using a standard technique. The polymerization can be terminated with a conventional noncoupling type of terminator (such as water, an acid and a lower alcohol) or with a coupling agent.

The high Tg IBR produced is then recovered from the organic solvent. The high Tg IBR can be recovered from the organic solvent by standard techniques, such as decantation, filtration, centrification and the like. It is often desirable to precipitate the high Tg IBR from the organic solvent by the addition of lower alcohols containing from 1 to about 4 carbon atoms to the polymer solution. Suitable lower alcohols for precipitation of the high Tg IBR from the polymer cement include methanol, ethanol, isopropyl alcohol, n-propyl alcohol and t-butyl alcohol. The utilization of lower alcohols to precipitate the high Tg IBR from the polymer cement also "kills" the living IBR chains by inactivating lithium end groups. After the IBR is recovered from the organic solvent, steam-stripping can be employed to reduce the level of volatile organic compounds in the rubber.

The high Tg IBR made by the process of this invention is characterized by being comprised of repeat units which are derived from about 20 weight percent to about 80 weight percent isoprene and from about 20 weight percent to about 80 weight percent 1,3-butadiene, wherein the repeat units derived from isoprene and 1,3-butadiene are in essentially random order. The repeat units which are derived from isoprene or 1,3-butadiene differ from the monomer from which they were derived in that a double bond was consumed by the polymerization reaction.

The repeat units derived from isoprene and 1,3-butadiene are in the IBR in an essentially random order. The term "random" as used herein means that the repeat units which are derived from isoprene are well dispersed throughout the polymer and are mixed in with repeat units which are derived from 1,3-butadiene. For purposes of this patent, "random" means that over 60 percent of the isoprene in the IBR is present in blocks of three or less repeat units.

The high Tg IBR used in the tire treads of this invention can also be made by the process described in U.S. Pat. No. 5,336,739, the teachings of which are incorporated herein by reference in their entirety. In this process, isoprene is copolymerized with 1,3-butadiene in the presence of a catalyst system which is comprised of (a) an initiator selected from the group consisting of organolithium compounds, organosodium compounds, organomagnesium compounds and organobarium compounds; and (b) a modifier, such as ethyl tetrahydrofurfuryl ether, propyl tetradhyrofurfuryl ether or butyl tetrahydrofurfuryl ether.

The modifiers of this type that can be used to synthesize high Tg IBR are of the structural formulae:

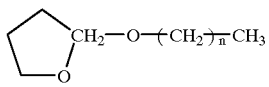

wherein n is an integer from 1 to about 10. It is preferred for n to be an integer from 5 to 9 and most preferred for n to be 5. The most preferred alkyl tetrahydrofurfuryl ether modifier is hexyltetrahydrofurfuryl ether.

Modifier of this type can be introduced into the polymerization zone being utilized in any manner. In one embodiment, it can be reacted with the organometallic compound with the reaction mixture therefrom being introduced into the polymerization zone as the initiator. In another embodiment, the modifier can be introduced into the polymerization zone directly without first being reacted with the organometallic compound being utilized as the initiator. In other words, the modifiers can be introduced into the polymerization zone in the form of a reaction mixture with the organometallic initiator or they can be introduced into the polymerization zone separately.

The high Tg IBR used in accordance with this invention in making tire treads can be compounded utilizing conventional ingredients and standard techniques. For instance, the high Tg IBR containing blends will typically be blended with carbon black, sulfur, fillers, accelerators, oils, waxes, scorch inhibiting agents and processing aids. Additionally, up to about 40 phr of rubbery polymers in addition to the high Tg IBR can be included in the tread rubber compounds of this invention. For instance, isoprene-butadiene rubbers having glass transition temperatures of less than about −40° C. (low Tg IBR), high cis-1,4-polybutadiene rubber, natural rubber, synthetic polyisoprene rubber, 3,4-polyisoprene, styrene-butadiene rubber and/or styrene-isoprene-butadiene rubbers can be included in such blends. In most cases, at least about 30 phr of the high Tg IBR will be present in the blend. More typically, at least about 40 phr of the high Tg IBR will be present in the blend. For instance, the blend can contain from about 65 phr to about 90 phr of the high Tg IBR and from about 10 phr to about 35 phr of high cis-1,4-polybutadiene, low Tg IBR or natural rubber. Such blends can also contain from about 70 phr to about 85 phr of the high Tg IBR and from about 15 phr to about 30 phr of high cis-1,4-polybutadiene, low Tg IBR or natural rubber.

In most cases, the high Tg IBR containing rubber blends will be compounded with sulfur and/or a sulfur containing compound, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally, from 40 phr to 150 phr of filler will be utilized in the blend with 50 phr to 100 phr of filler being preferred. It is typically most preferred for the tire tread compound to contain from about 70 phr to about 85 phr of filler. It is critical for the filler to include at least about 20 phr of silica. In most cases, the filler will be comprised substantially of silica and will contain at least about 40 phr and preferably at least 50 phr of silica. However, in most cases, at least some carbon black will be utilized in the filler. For instance, it is highly preferred to utilize about 70 phr to about 80 phr of silica and about 3 phr to about 8 phr of carbon black as the filler. Small amounts of clays and/or talc can be included in the filler to reduce cost.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate; e.g., sodium silicate.

Such silicas might be characterized, for example, by having a BET surface area, as measured using nitrogen gas, preferably in the range of about 40 to about 600 and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400 and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3.

It is also critical for the tread rubber compounds of this invention to contain a silica coupling agent to fully realize the total advantages of the blends of this invention. The silica coupling agent will typically be a sulfur containing organosilicon compound. Examples of suitable sulfur-containing organosilicon compounds are of the formula:

in which Z is selected from the group consisting of

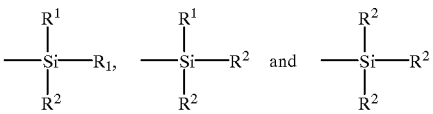

where $R^1$ is an alkyl group of 1 to 4 carbon atoms, cyclohexyl or phenyl; wherein $R^2$ is alkoxy of 1 to 8 carbon atoms or cycloalkoxy of 5 to 8 carbon atoms; and wherein Alk is a divalent hydrocarbon of 1 to 18 carbon atoms and n is an integer of 2 to 8.

Specific examples of sulfur-containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilyipropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxyethoxy propoxysilyl 3'-diethoxybutoxy-silylpropyltetrasulfide, 2,2'-bis (dimethylmethoxysilylethyl) disulfide, 2,2'-bis (dimethylsec.butoxysilylethyl) trisulfide, 3,3'-bis (methylbutylethoxysilylpropyl) tetrasulfide, 3,3'-bis(di t-butylmethoxysilylpropyl) tetrasulfide, 2,2'-bis (phenylmethyl methoxysilylethyl) trisulfide, 3,3'-bis (diphenyl isopropoxysilylpropyl) tetrasulfide, 3,3'-bis (diphenyl cyclohexoxysilylpropyl) disulfide, 3,3'-bis (dimethyl ethylmercaptosilylpropyl) tetrasulfide, 2,2'-bis (methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec.butoxysilylpropyl) disulfide, 3,3'-bis (propyldiethoxysilylpropyl) disulfide, 3,3'-bis (butyldimethoxysilylpropyl) trisulfide, 3,3'-bis (phenyldimethoxysilylpropyl) tetrasulfide, 3-phenylethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide and 3,3'-bis(dimethoxyphenylsilyl-2-methylpropyl) disulfide.

The preferred sulfur-containing organosilicon compounds are the 3,3'-bis(trimethoxy or triethoxy silylpropyl) sulfides. The most preferred compound is 3,3'-bis(triethoxysilylpropyl) tetrasulfide. Therefore, as to Formula I, preferably Z is

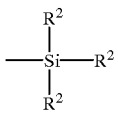

where $R_2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur-containing organosilicon compound of Formula I in a rubber composition will vary, depending on the level of silica that is used. Generally speaking, the amount of the compound of Formula I will range from about 0.01 to about 1.0 parts by weight per part by weight of the silica. Preferably, the amount will range from about 0.02 to about 0.4 parts by weight per part by weight of the silica. More preferably, the amount of the compound of Formula I will range from about 0.05 to about 0.25 parts by weight per part by weight of the silica. It is to be appreciated that the silica coupler may be used in conjunction with carbon black; namely, pre-mixed with carbon black prior to addition to the rubber composition, and such carbon black is to be included in the aforesaid amount of carbon black for the rubber composition formulation.

Tire tread formulations will typically be mixed utilizing a thermomechanical mixing technique. The mixing of the tire tread rubber formulation can be accomplished by methods known to those having skill in the rubber mixing art. For example, the ingredients are typically mixed in at least two stages; namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur-containing organosilicon, and carbon black, if used, are mixed in one or more non-productive mix stages. The terms "non-productive" and "productive" mix stages are well known to those having skill in the rubber mixing art. The sulfur-vulcanizable rubber composition containing the sulfur-containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The blend will also normally include from 0.1 phr to 2.5 phr of at least one accelerator with 0.2 phr to 1.5 phr being preferred. Antidegradants, such as antioxidants and antiozonants, will generally be included in the blend in amounts ranging from 0.25 phr to 10 phr with amounts in the range of 1 phr to 5 phr being preferred. Processing oils will generally be included in the blend in amounts ranging from 2 phr to 100 phr with amounts ranging from 5 phr to 50 phr being preferred. The high Tg IBR containing blends of this invention will also normally contain from 0.5 phr to 10 phr of zinc oxide with 1 phr to 5 phr being preferred. These blends can optionally contain from 0 to 10 phr of tackifier resins, 0 to 10 phr of reinforcing resins, 1 to 10 phr of fatty acids, 0 to 2.5 phr of peptizers and 0 to 1 phr of scorch inhibiting agents.

The high Tg IBR containing rubber blends of this invention can be used in tire treads in conjunction with ordinary tire manufacturing techniques. Tires are built utilizing standard procedures with the high Tg IBR simply being substituted for the rubber compounds typically used as the tread rubber. After the tire has been built with the high Tg IBR containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 14 minutes with a cure cycle of about 12 minutes being most preferred.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLES 1–5

In this experiment, a high Tg IBR was synthesized using methyl tetrahydrofurfuryl ether as the modifier. In the procedure used, 1,500 grams of a silica/molecular sieve/aluminum dried premix containing a 19.4 percent 50:50 mixture of isoprene and 1,3-butadiene in hexane was charged into a one-gallon (3.8 liters) reactor. After the scavenger level of 2.9 ppm, as determined, neat MTE (ethyl tetrahydrofurfuryl ether; 7.2 M) and 1.65 ml of a 0.75 M solution of n-butyl lithium (in hexane; 1.3 ml for initiation and 0.35 ml for scavenging the premix) was added to the reactor. The polymerization was allowed to proceed at 70° C. for 1 hbur. Analysis of the residual monomers contained in the polymerization mixture by gas chromatograph indicated that the polymerization was 96.5 percent complete at this time. The polymerization was continued for another 30 minutes to assure 100 percent conversion. Then, 5 ml of 1 M ethanol solution (in hexane) was added to the reactor to shortstop the polymerization and polymer was removed from the reactor and stabilized with 1 phm of antioxidant. After evaporating hexane, the resulting polymer was dried in a vacuum oven at 50° C.

The Tgs of the IBRs produced along with the MTE/n-BuLi ratios utilized are shown in Table I.

TABLE 1

50/50 Isoprene-Butadiene Copolymers Prepared Via MTE/n-BuLi at 70° C.

| Ex No | MTE/n-BuLi Ratio | Tg (° C.) | Microstructure (%) | | | | |
|---|---|---|---|---|---|---|---|
| | | | 1,2-PBd | 1,4-PBd | 1,2-PI | 3,4-PI | 1,4-PI |
| 1 | 1.0 | −48 | 24 | 27 | ND | 27 | 22 |
| 2 | 2.0 | −39 | 28 | 23 | 2 | 31 | 16 |
| 3 | 3.0 | −37 | 31 | 22 | 2 | 31 | 14 |
| 4 | 5.0 | −32 | 32 | 19 | 4 | 34 | 11 |
| 5 | 10.0 | −30 | 32 | 19 | 5 | 34 | 10 |

EXAMPLES 6–12

In this experiment, various blends of high Tg IBR were made and compared with a conventional silica containing tread rubber (Example 6). In Examples 7–10, the high Tg IBR utilized contained 27 percent bound isoprene, had a Mooney ML1+4 viscosity of 48 and had a Tg of −33° C. This high Tg IBR contained 4.2 percent 1,2-polyisoprene repeat units, 5.8 percent 1,4-polyisoprene repeat units, 17.4 weight percent 3,4-polyisoprene repeat units, 46.6 percent 1,2-polybutadiene repeat units and 26 percent 1,4-polybutadiene repeat units. In Examples 11 and 12, the high Tg IBR utilized contained 66 percent bound isoprene, had a Mooney ML1+4 viscosity of 62 and had a Tg of −36° C. This high Tg IBR contained 29.9 percent 1,4-polyisoprene repeat units, 36.3 percent 3,4-polyisoprene repeat units, 15.2 percent 1,2-polybutadiene repeat units and 18.6 percent 1,4-polybutadiene repeat units. The results of these comparisons are shown in Table II.

TABLE II

| Example | 6 | 7 | 8 | 9 | 10 | 11 | 12 |
|---|---|---|---|---|---|---|---|
| SBR | 25 | | | | | | |
| IBR (−42° C. Tg) | 45 | | | | | | |
| IBR (−83° C. Tg) | | 30 | | | 15 | | |
| PBD | 20 | | 20 | 15 | 10 | 20 | 15 |
| NR | 10 | | | | | | |
| 27/73 IBR Tg-33 | | 70 | 80 | 85 | 75 | | |
| 66/34 IBR Tg-36 | | | | | | 80 | 85 |
| Silica | 83 | 80 | 80 | 75 | 75 | 80 | 75 |
| Ring Modulus, Temp 23 C. Cure 14 Min/160 C. | | | | | | | |
| Shore A | 69 | 68 | 67.5 | 69 | 67.5 | 71 | 69 |
| 300% Modulus | 10.6 | 12 | 12 | 13.6 | 12.3 | 10.7 | 11.4 |
| Mod Ratio | 4.42 | 4.80 | 4.80 | 5.23 | 4.92 | 4.12 | 4.22 |
| True Tensile | 89.2 | 67.3 | 60.2 | 60.3 | 77.2 | 84.1 | 85.8 |
| Goodrich Flex DT | 35.8 | 30.7 | 31.7 | 29.7 | 29.9 | 31.1 | 29 |
| Reb 100° C.–Reb 23° C. | 23.9 | 30 | 31.4 | 32.1 | 29.5 | 30.3 | 31.8 |
| Reb 100° C.–Reb 0° C. | 41.5 | 52.2 | 53.2 | 56.0 | 52.5 | 50.2 | 52.3 |
| Tan Delta- Metravib Temp | | | | | | | |
| 50° C./Strain 0.75% | 0.171 | 0.148 | 0.146 | 0.135 | 0.138 | 0.157 | 0.145 |
| 0° C./Strain 6.7% | 0.404 | 0.436 | 0.441 | 0.454 | 0.424 | 0.464 | 0.472 |
| −10° C./Strain 6.7% | 0.540 | 0.635 | 0.675 | 0.727 | 0.621 | 0.674 | 0.688 |

The low rebound levels found in Examples 7–12 at 0° C. is indicative of good wet traction. The high tan delta values found at 0° C. are also indicative of good traction characteristics. Examples 7–12 also showed high rebound at 100° C. which is indicative of good rolling resistance. This is consistent with the low tan delta values found in Examples 7–12 at 50° C. which are also indicative of low hysteresis and good rolling resistance.

While certain representative embodiments and details have been shown for the purpose of illustrating the subject invention, it will be apparent to those skilled in this art that various changes and modifications can be made therein without departing from the scope of the subject invention.

What is claimed is:

1. A tire tread rubber composition which is comprised of (1) at least about 70 phr of an isoprene-butadine rubber having a glass transition temperature which is within the range of about −40° C. to −25° C., (2) 40 phr to 150 phr of a filler, with the proviso that the filler contains at least about 40 phr of silica, and (3) a silica coupling agent.

2. A tie tread rubber composition as specified in claim 1 wherein the filler contains at least about 50 phr of silica.

3. A tire tread rubber composition as specified in claim 2 wherein at least about 75 phr of the isoprene-butadiene rubber is present.

4. A tire tread rubber composition as specified in claim 1 which is further comprised of a rubber selected from the group consisting of isoprene-butadiene rubbers having glass transition temperatures of less than about −40° C., high cis-1,4-polybutadiene rubber, natural rubber, synthetic polyisoprene rubber, 3,4-polyisoprene, styrene-butadiene rubber and styrene-isoprene-butadiene rubber.

5. A tire tread rubber composition as specified in claim 1 which is further comprised of about 15 phr to about 30 phr of high cis-1,4-polybutadiene rubber.

6. A tire tread rubber composition as specified in claim 1 which is further comprised of about 15 phr to about 30 phr of an isoprene-butadiene rubber having a glass transition temperature of less than −40° C.

7. A tire tread rubber composition as specified in claim 1 wherein the filler is present at a level which is within the range of about 50 phr to about 100 phr.

8. A tire tread rubber composition as specified in claim 3 wherein the filler is present at a level which is within the range of about 70 phr to about 85 phr.

9. A tire tread rubber composition as specified in claim 1 which is further comprised of carbon black.

10. A tire tread rubber composition as specified in claim 9 wherein the carbon black is present at a level which is within the range of about 3 phr to about 8 phr and wherein the silica is present at a level which is within the range of about 70 phr to about 80 phr.

11. A tire tread rubber composition as specified in claim 9 wherein the isoprene-butadiene rubber has a glass transition temperature which is within the range of about −38° C. to about −30° C.

12. A tire tread rubber composition as specified in claim 9 wherein the isoprene-butadiene rubber has a glass transition temperature which is within the range of about −36° C. to about −32° C.

13. A tire tread rubber composition as specified in claim 9 wherein the silica coupling agent is selected from the group consisting of 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) dosulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis (tri-2"-methylcyclohexoxysilylethyl) tetrasulfide, bis(trimethoxysilylmethyl) tetrasulfide, 3-methoxyethoxy propoxysilyl 3'-diethoxybutoxy-silylpropyltetrasulfide, 2,2'-bis(dimethylmethoxysilylethyl) disulfide, 2,2'-bis (dimethylsec.butoxysilylethyl) trisulfide, 3,3'-bis(methylbutylethoxysilylpropyl) tetrasulfide, 3,3'-bis(di t-butylmethoxysilylpropyl) tetrasulfide, 2,2'-bis(phenylmethyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec.butoxysilylpropyl) disulfide, 3,3'-bis(propyldiethoxysilylpropyl) disulfide, 3,3'-bis(butyldimethoxysilylpropyl) trisulfide, 3,3'-bis(phenyldimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl)trisulfide, 3,3'-bis(trimethoxysilyl-2-methylpropyl) tetrasulfide and 3,3'-bis(dimethoxyphenylsilyl-2-methylpropyl) disulfide.

14. A tire tread rubber composition as specified in claim 9 wherein the silica coupling agent is a sulfur-containing organosilicon compounds.

15. A tire tread rubber composition as specified in claim 14 wherein the sulfur-containing organosilicon compound is a 3,3'-bis(trimethoxy or triethoxy silylpropyl) sulfide.

16. A tire tread rubber composition as specified in claim 9 wherein the silica coupling agent is 3,3'-bis(triethoxysilylpropyl) tetrasulfide.

17. A pneumatic tire having an outer circumferential tread wherein said tread is a sulfur-cured rubber composition which is comprised of (1) at least about 70 phr of an isoprene-butadine rubber having a glass transition temperature which is within the range of about −40° C. to −25 ° C., (2) 40 phr to 150 phr of a filler, with the proviso that the filler contains at least about 40 phr of silica, and (3) a silica coupling agent.

* * * * *